US012387681B1

(12) United States Patent
Sun et al.

(10) Patent No.: US 12,387,681 B1

(45) Date of Patent: Aug. 12, 2025

(54) PIXEL CIRCUIT AND DRIVING METHOD THEREOF

(71) Applicant: SEMICONDUCTOR INTEGRATED DISPLAY TECHNOLOGY CO., LTD., Wuhu (CN)

(72) Inventors: Lin Sun, Wuhu (CN); Shengfang Liu, Wuhu (CN)

(73) Assignee: SEMICONDUCTOR INTEGRATED DISPLAY TECHNOLOGY CO., LTD., Wuhu (CN)

( * ) Notice: Subject to any disclaimer, the term of this patent is extended or adjusted under 35 U.S.C. 154(b) by 0 days.

(21) Appl. No.: 18/930,144

(22) Filed: Oct. 29, 2024

(30) Foreign Application Priority Data

Jun. 8, 2024 (CN) ......................... 202410740349.2

(51) Int. Cl.
*G09G 3/3233* (2016.01)

(52) U.S. Cl.
CPC ... *G09G 3/3233* (2013.01); *G09G 2300/0852* (2013.01); *G09G 2300/0861* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 11,978,373 B1 * | 5/2024 | Huang | G09G 3/32 |
| 2021/0074210 A1 * | 3/2021 | Yuan | G09G 3/3233 |
| 2023/0096851 A1 * | 3/2023 | Liu | G09G 3/3426 345/55 |
| 2023/0111185 A1 * | 4/2023 | Sun | H01L 25/167 257/40 |

* cited by examiner

*Primary Examiner* — Aneeta Yodichkas

(74) *Attorney, Agent, or Firm* — Meunier Carlin & Curfman LLC

(57) ABSTRACT

The present disclosure provides a pixel circuit and driving method thereof. The pixel circuit includes: a data writing element configured for controlling an input of a data signal; a first energy storage element configured for storing the data signal output from the data writing element; a second energy storage element configured for storing the data signal together with the first energy storage element; a light-emitting element configured for light-emitting display; a drive element, an output end of which is configured for providing a light-emitting current to the light-emitting element; a light-emitting control transistor configured for controlling a conduction between the drive element and the light-emitting element; a compensation element; and a first reset element.

14 Claims, 5 Drawing Sheets

PIXEL CIRCUIT AND DRIVING METHOD THEREOF

CROSS-REFERENCE TO RELATED APPLICATIONS

The application claims priority to Chinese Patent Application No. 202410740349.2, filed on Jun. 8, 2024, which is hereby incorporated by reference in its entirety.

TECHNICAL FIELD

The present disclosure relates to the field of display technology, and in particular to a pixel circuit and driving method thereof.

BACKGROUND

Organic Light-emitting Diode (OLED) is one of the hot spots in the field of flat panel display research. Compared with liquid crystal display, OLED has the advantages of low energy consumption, low production cost, self-luminous, wide viewing angle and fast response speed, etc. At present, in the field of flat panel display such as cell phone, PDA, digital camera, etc., OLED has begun to replace the traditional liquid crystal display (LCD). Here, the design of a drive circuit is the key technology to realize display function.

The drive circuit can generally include a scan drive circuit, a light-emitting control circuit, a data drive circuit, a pixel circuit, etc., of which the pixel circuit design is the core technology content of OLED display, which is of great research significance.

With the development of display technology, users have higher and higher requirements for display effects. Pixels Per Inch (PPI) is a unit of measurement that indicates a screen resolution, which is used to describe the number of pixels per inch on display devices (such as display, cell phone screen, etc.). The higher the PPI is, the more detailed and clearer the displayed images and text will be. Specifically, PPI is calculated by dividing horizontal and vertical pixels of a display screen by a physical width and height of a screen. For example, if a screen has a resolution of 1920×1080 pixels and a screen size of 5 inches, then its PPI can be calculated. High PPI is very important in modern display technology, especially for devices such as smartphones, tablets, and high-resolution displays, as it directly impacts the user experience by providing sharper and clearer image quality and more detailed text display.

In high PPI displays, the size of each pixel is very small, which requires a very high level of integration and a compact layout of the drive circuit. The presence of multiple transistor nodes increases the complexity and size of the circuit, which further limits the pixel density. Therefore, in order to achieve high PPI, the circuit design needs to be simplified as much as possible by reducing the number of transistors and optimizing the layout to improve circuit integration and efficiency. When the traditional OLED device emits light, a data writing circuit, reset circuit, and compensation circuit are in an off state, however, it is not conducive to the realization of high PPI due to the large number of TFT nodes connected to an energy storage circuit.

SUMMARY

In order to solve the problem in the related art, the present disclosure provides a pixel circuit and a driving method thereof.

The present disclosure provides a pixel circuit including: a data writing element, configured for controlling an input of a data signal; a first energy storage element, where a first end of the first energy storage element is connected to an output end of the data writing element, and the first energy storage element is configured for storing the data signal output from the data writing element; a second energy storage element, where a first end of the second energy storage element is connected to a high level VDD, and a second end of the second energy storage element is connected to a second end of the first energy storage element, and the second energy storage element is configured for storing the data signal together with the first energy storage element; a light-emitting element, configured for light-emitting display; a drive element, where an input end of the drive element is connected to the high level VDD, a control end of the drive element is connected to the second end of the first energy storage element, and an output end of the drive element is configured for providing a light-emitting current to the light-emitting element; a light-emitting control transistor, where an input end of the light-emitting control transistor is connected to the output end of the drive element, a control end of the light-emitting control transistor is input a light-emitting control signal, and an output end of the light-emitting control transistor is connected to the light-emitting element, and the light-emitting control transistor is configured for controlling a conduction between the drive element and the light-emitting element; a compensation element, where an output end of the compensation element is connected to the second end of the first energy storage element, a control end of the compensation element is input a compensation control signal, and an input end of the compensation element is connected to the output end of the drive element; a first reset element, where an input end of the first reset element is connected to the input end of the compensation element, and an output end of the first reset element is connected to the first end of the first energy storage element.

Optionally, the data writing element includes a first PMOS transistor, and a source electrode of the first PMOS transistor is input the data signal.

Optionally, the first energy storage element includes a first capacitor, and a first end of the first capacitor is connected to the output end of the data writing element.

Optionally, the second energy storage element includes a second capacitor, a first end of the second capacitor is connected to the high level VDD, and a second end of the second capacitor is connected to a second end of the first capacitor.

Optionally, the driver element is a PMOS transistor, a source electrode of the PMOS transistor is connected to the high level VDD, and a gate electrode of the PMOS transistor is connected to the second end of the first capacitor and the second end of the second capacitor.

Optionally, the compensation element includes a second PMOS transistor, a drain electrode of the second PMOS transistor is connected to the first end of the first capacitor, and a gate electrode of the second PMOS transistor is input the compensation control signal.

Optionally, the light-emitting control transistor includes a third PMOS transistor, a source electrode of the third PMOS transistor is connected to a source electrode of the second PMOS transistor, and a gate electrode of the third PMOS transistor is input the light-emitting control signal.

Optionally, an input end of the light-emitting element is connected to a drain electrode of the light-emitting control transistor.

Optionally, the pixel circuit further includes: a second reset element connected to an input end of the light-emitting element and configured to reset the light-emitting element.

Optionally, the second reset element includes a fourth PMOS transistor, a source electrode of the fourth PMOS transistor is connected to a drain electrode of the light-emitting control transistor, a gate electrode of the fourth PMOS transistor is input a second reset signal, and a drain electrode of the fourth PMOS transistor is input an initialization signal.

Optionally, the first reset element includes a fifth PMOS transistor, and a gate electrode of the fifth PMOS transistor is input a first reset control signal.

Optionally, the first reset element includes a fifth PMOS transistor and a sixth PMOS transistor, where a gate electrode of the fifth PMOS transistor is input a first reset control signal, a drain electrode of the fifth PMOS transistor is connected to the output end of the data writing element, and a source electrode of the fifth PMOS transistor is input an initialization signal; a drain electrode of the sixth PMOS transistor is input the initialization signal, a source electrode of the sixth PMOS transistor is connected to the second end of the first energy storage element, and a gate electrode of the sixth PMOS transistor is input the first reset control signal.

Optionally, the first reset element includes a fifth PMOS transistor and a sixth PMOS transistor, where a gate electrode of the fifth PMOS transistor is input a first reset control signal, a drain electrode of the fifth PMOS transistor is connected to the output end of the data writing element, and a source electrode of the fifth PMOS transistor is input an initialization signal; a drain electrode of the sixth PMOS transistor is connected to the first end of the first energy storage element, a source electrode of the sixth PMOS transistor is connected to the input end of the compensation element, and a gate electrode of the sixth PMOS transistor is input the first reset control signal.

The present disclosure further provides a method of driving a pixel circuit, including: turning on initialization by turning on the data writing element, turning on the first reset element, turning on a second reset element, and turning on the drive element; turning on self-discharging by turning on the data writing element, turning on the compensation element, turning on the second reset element, and turning off the first reset element; writing information by turning on the data writing element, turning on the second reset element, and turning off the compensation element; emitting light by turning off the data writing element, turning off the second reset element, and turning on the light-emitting control transistor.

Compared with the related art, the technical solution of the embodiments of the present disclosure has the following beneficial effects.

The present disclosure proposes a pixel circuit and a realization method suitable for Micro OLEDs, which facilitates the realization of high PPI by setting fewer transistors in the reset circuit, so that the display quality of the panel can be improved.

BRIEF DESCRIPTION OF FIGURES

In order to more clearly illustrate the technical solutions in the embodiments of the present disclosure, the accompanying drawings to be used in the description of the embodiments will be briefly introduced below, and it will be obvious that the accompanying drawings in the following description are only some of the embodiments of the present disclosure, and that other accompanying drawings can be obtained based on these drawings for the person skilled in the art without creative labor.

DETAILED DESCRIPTION

Figure 1:
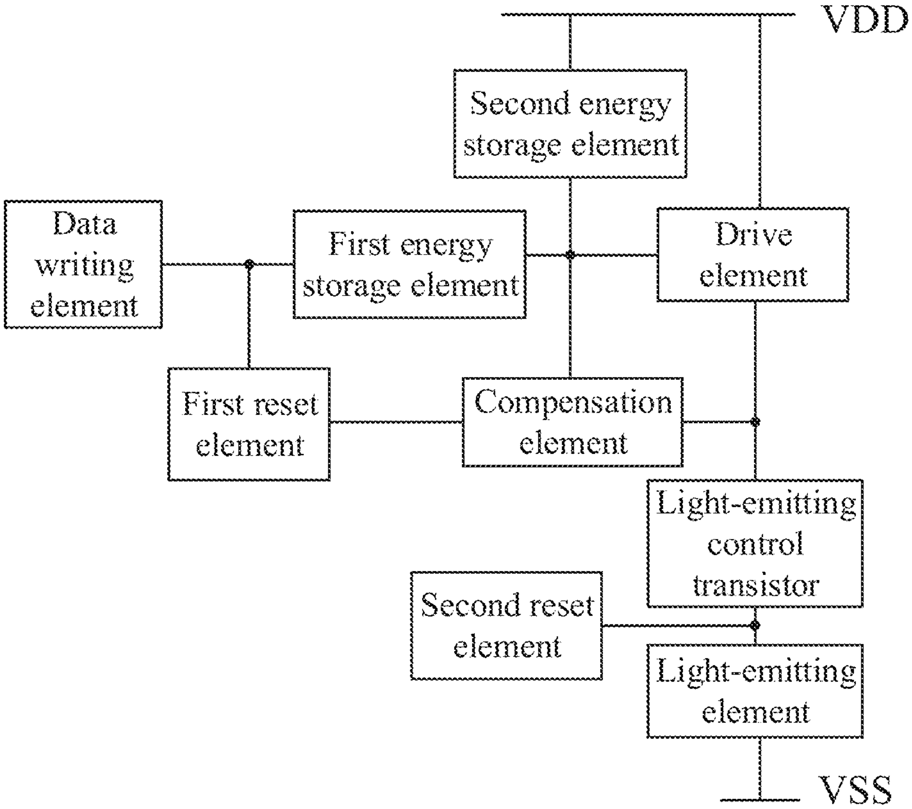
FIG. 1 shows a schematic diagram of a structure of a pixel circuit of some embodiments of the present disclosure.

Preferred embodiments of the present disclosure will be described in greater detail below. Although preferred embodiments of the present disclosure are described below, it should be understood that the present disclosure may be realized in various forms and should not be limited by the embodiments set forth herein.

In the present disclosure, in the absence of any indication to the contrary, the use of orientation terms such as "upper and lower" generally refers to the upper and lower portions of the device in its normal state of use, and the terms "inner and outer" refer to the contours of the device relative to the contours of the device. Furthermore, the terms "first, second, third" are used only for descriptive purposes and are not to be understood as indicating or implying relative importance or implicitly specifying the number of technical features indicated. Thus, a feature defined with "first, second, third" may expressly or implicitly include one or more such features. In the description of the present disclosure, "multiple" or "plurality of" means two or more, unless otherwise expressly and specifically limited. The device in the present disclosure is an electrical device, and therefore connections and interconnections denote conductive interconnections. Since the accompanying drawings are descriptions of the same device, the same symbol in the drawings indicates the same element.

With the development of display technology, users have higher and higher requirements for display effects. Pixels Per Inch (PPI) is a unit of measurement that indicates a screen resolution, which is used to describe the number of pixels per inch on display devices (such as display, cell phone screen, etc.). The higher the PPI is, the more detailed and clearer the displayed images and text will be. High PPI is very important in modern display technology, especially for devices such as smartphones, tablets, and high-resolution displays, as it directly impacts the user experience by providing sharper and clearer image quality and more detailed text display.

In high PPI displays, the size of each pixel is very small, which requires a very high level of integration and a compact layout of the drive circuit. The presence of multiple transistor nodes increases the complexity and size of the circuit, which further limits the pixel density. Therefore, in order to achieve high PPI, the circuit design needs to be simplified as much as possible by reducing the number of transistors and optimizing the layout to improve circuit integration and efficiency.

Specific embodiments of the present disclosure are described in further detail below in conjunction with the accompanying drawings. FIG. 1 is a schematic diagram of a structure of a pixel circuit according to embodiments of the present disclosure. As shown in FIG. 1, the pixel circuit of the present disclosure includes: a data writing element configured for controlling an input of a data signal; a first energy storage element, where a first end of the first energy storage element is connected to an output end of the data writing element to store the data signal output from the data writing element; a second energy storage element, where a first end of the second energy storage element is connected to a high level voltage of device drain (VDD), where the voltage of device drain represents a power voltage, and a second end of the second energy storage element is connected to a second end of the first energy storage element, and the second energy storage element is configured for storing the data signal together with the first energy storage element; a light-emitting element, configured for light-emitting display; a drive element, where an input end of the drive element is connected to the high level VDD, a control end of the drive element is connected to the second end of the first energy storage element, and an output end of the drive element is configured for providing a light-emitting current to the light-emitting element; a light-emitting control transistor, where an input end of the light-emitting control transistor is connected to the output end of the drive element, a control end of the light-emitting control transistor is connected to a light-emitting control signal, and an output end of the light-emitting control transistor is connected to the light-emitting element, and the light-emitting control transistor is configured for controlling a conduction between the drive element and the light-emitting element; a compensation element, where an output end of the compensation element is connected to the second end of the first energy storage element, a control end of the compensation element is connected to a compensation control signal, and an input end of the compensation element is connected to the output end of the drive element; and a first reset element, where an input end of the first reset element is connected to the input end of the compensation element, and an output end of the first reset element is connected to the first end of the first energy storage element.

In the embodiments of the present disclosure, the pixel circuit further includes a second reset element, the second reset element is connected to the input end of the light-emitting element to reset the light-emitting element.

Figure 2:
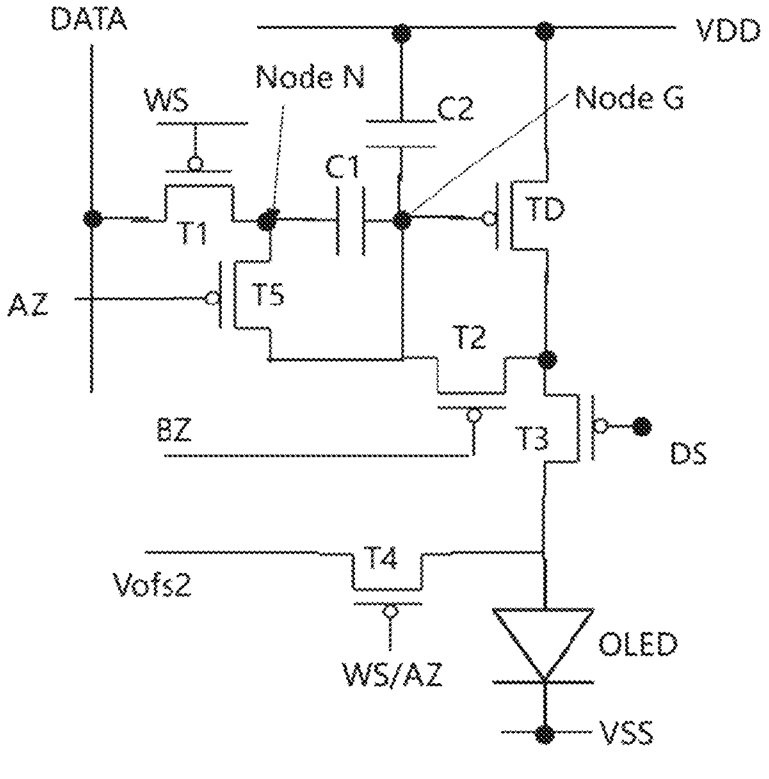
FIG. 2 shows a circuit diagram of a pixel circuit of a first embodiment of the present disclosure.

FIG. 2 is a circuit diagram of a pixel circuit of a first embodiment of the present disclosure. As shown in FIG. 2, in this embodiment, the data writing element includes a first PMOS transistor T1, a source electrode of the first PMOS transistor T1 is connected to a data signal. The first energy storage element includes a first capacitor C1, a first end of the first capacitor C1 is connected to the output end of the data writing element. The second energy storage element includes a second capacitor C2, a first end of the second capacitor C2 is connected to a high level VDD, and a second end of the second capacitor C2 is connected to a second end of the first capacitor C1. The drive element TD is a PMOS transistor having a source electrode connected to the high level VDD and a gate electrode connected to the second end of the first capacitor C1 and the second end of the second capacitor C2. The compensation element includes a second PMOS transistor T2 having a drain electrode connected to the first end of the first capacitor C1 and a gate electrode connected to a compensation control signal. The light-emitting control transistor includes a third PMOS transistor T3 having a source electrode connected to the source electrode of the second PMOS transistor and a gate electrode connected to the light-emitting control signal. The first reset element includes a fifth PMOS transistor T5, a gate electrode of the fifth PMOS transistor T5 is connected to a first reset control signal. The second reset element includes a fourth PMOS transistor having a source electrode connected to the drain electrode of the third PMOS transistor T3, a gate electrode connected to the second reset signal and a drain electrode connected to an initialization signal. The input end of the light-emitting element is connected to the source electrode of the fourth PMOS transistor and the drain electrode of the light-emitting control transistor.

The present disclosure further provides a driving method of a pixel circuit, including the steps of: turning on initialization, the data writing element turning on, the first reset element turning on, the second reset element turning on, and the drive element turning on; turning on self-discharging, the data writing element turning on, the compensation element turning on, the second reset element turning on, and the first reset element turning off; writing information, the data writing element turning on, the second reset element turning on, the compensation element turning off; emitting light, the data writing element turning off, the second reset element turning off, and the light-emitting control transistor turning on.

Figure 3:
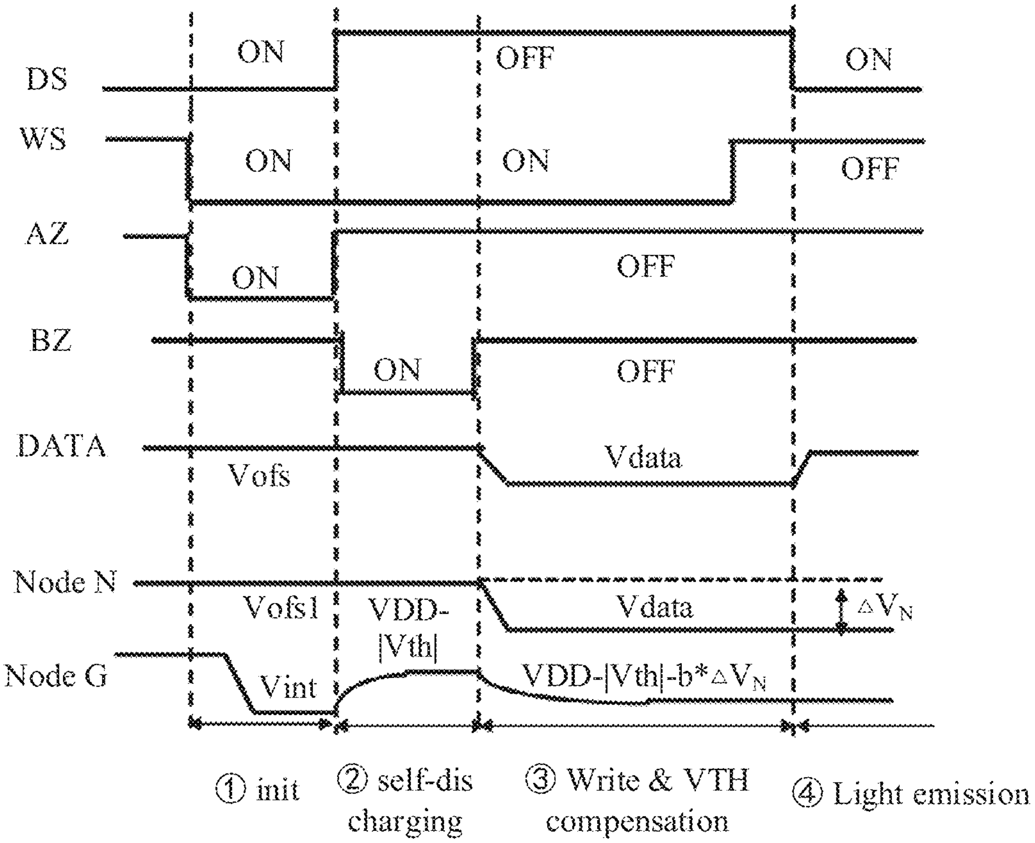
FIG. 3 shows a timing diagram of a driving method of the pixel circuit shown in FIG. 2.

FIG. 3 is a timing diagram of the driving method of the pixel circuit shown in FIG. 2. The driving method of the pixel circuit shown in FIG. 2 is described below in connection with a specific operating process.

First, in an initialization (init) stage, the data writing element is turned on, the first reset element is turned on, the second reset element is turned on, and the driver element is turned on. Specifically, with reference to FIG. 3, in the initialization stage, both T1/T5 are turned on, and DATA=Vofs1, N and G points are initialized respectively, which can ensure that TD is able to conduct in the next stage.

After that, the process goes to a self-discharging stage, the data writing element is turned on, the compensation element is turned on, the second reset element is turned on, and the first reset element is turned off. In the self-discharging stage, T1/T2 is turned on, and the potential of the G point gradually rises to VDD-$|V_{TH}|$, and TD is turned off.

Next, in a data writing stage, the data writing element is turned on, the second reset element is turned on, and the compensation element is turned off. Specifically, T1 is turned on, and the DATA voltage jumps from Vofs to the grayscale voltage Vdata, at which time the voltage of the G point changes through C1 coupling. In this stage, $$\Delta V_G = (1-b)\Delta V_N;$$

$$V_G = VDD - |V_{TH}| - b(Vofs1 - Vdata).$$

In addition, the gate electrode of T4 is controlled by WS or AZ, and the anode of OLED is reset by Vofs2 through T4.

After that, the process goes to a light-emitting phase, the data writing element is turned off, the second reset element is turned off, and the light-emitting control transistor is turned on. Specifically, in this phase, T3 is turned on, and the OLED starts to emit light.

$$Ioled = б*[(VDD - V_G) - |V_{TH}|]^2 = б*[b(Vofs1 - Vdata)]$$
2.

The first reset element in this embodiment applies to one transistor T5, which is conducive to high PPI, while the transistor T5 enables the OLED to be fully discharged during the initialization phase to avoid the risk of residual images.

In some other embodiments, the first reset element includes multiple PMOS transistors.

Figure 4:
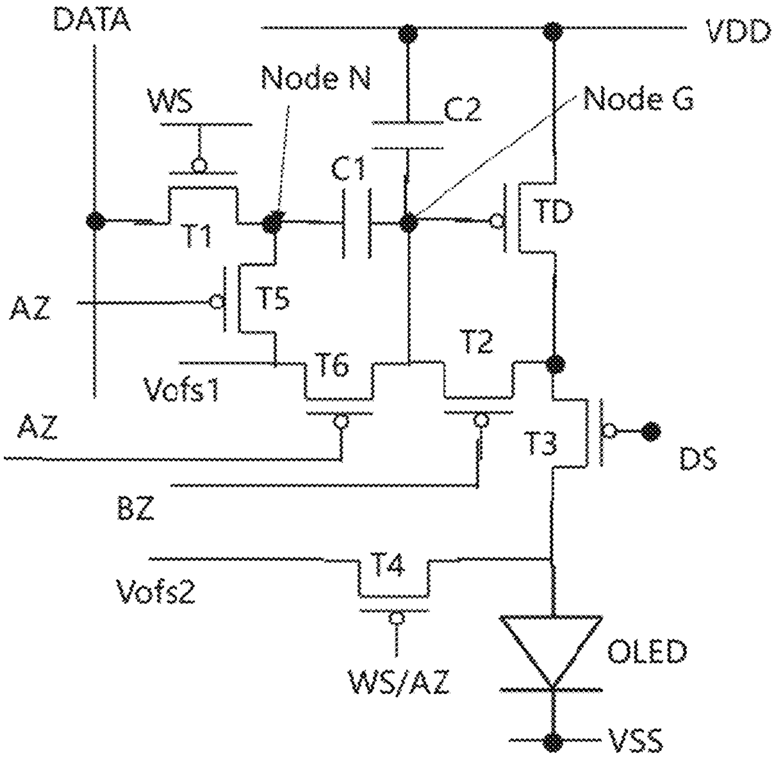
FIG. 4 shows a circuit diagram of a pixel circuit of a second embodiment of the present disclosure.

In a second embodiment of the present disclosure, the first reset element includes a fifth PMOS transistor and a sixth PMOS transistor. FIG. 4 illustrates a circuit diagram of a pixel circuit of the second embodiment of the present disclosure, where the gate electrode of the fifth PMOS transistor is connected to the first reset control signal, the drain electrode of the fifth PMOS transistor is connected to the output end of the data writing element, and the source electrode of the fifth PMOS transistor is connected to an initialization signal; and the drain electrode of the sixth PMOS transistor is connected to an initialization signal, the source electrode of the sixth PMOS transistor is connected to the second end of the first energy storage element, and the gate electrode of the sixth PMOS transistor is connected to a first reset control signal.

Figure 5:
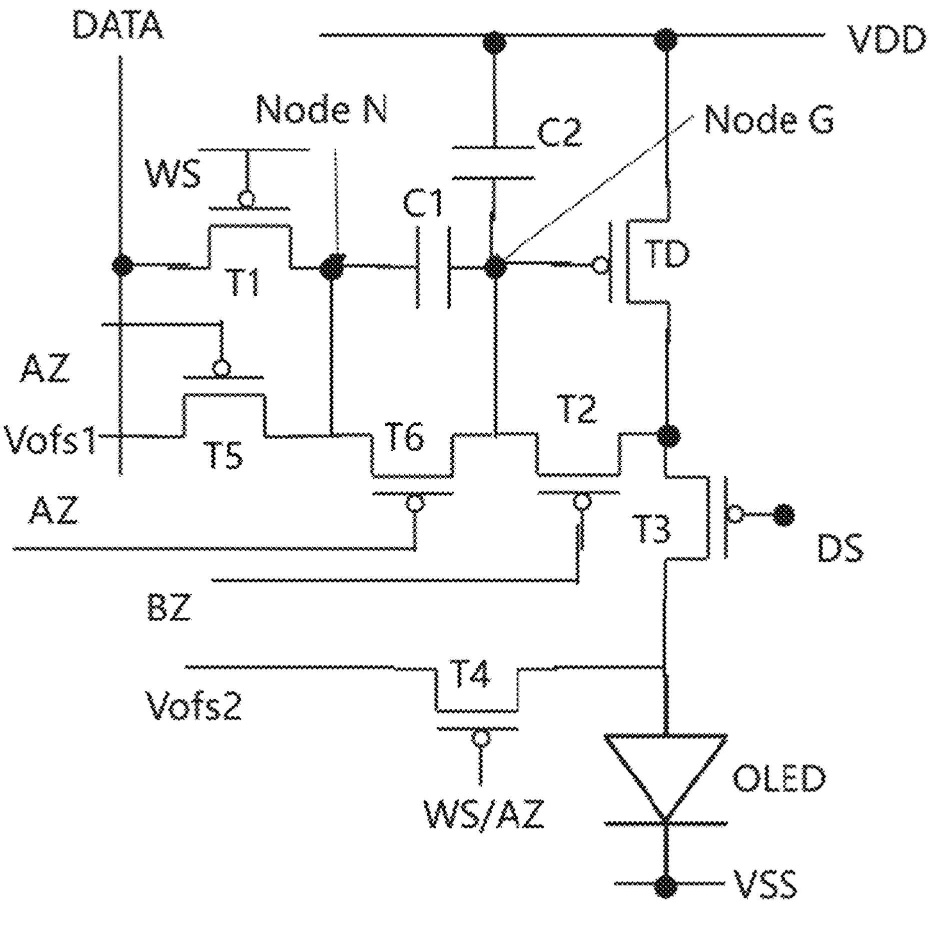
FIG. 5 shows a circuit diagram of a pixel circuit of a third embodiment of the present disclosure.

In a third embodiment of the present disclosure, the first reset element includes a fifth PMOS transistor and a sixth PMOS transistor. Referring to FIG. 5, the gate electrode of the fifth PMOS transistor is connected to the first reset control signal, the drain electrode of the fifth PMOS transistor is connected to the output end of the data writing element, and the source electrode of the fifth PMOS transistor is connected to an initialization signal; and the drain electrode of the sixth PMOS transistor is connected to the first end of the first energy storage element, the source electrode of the sixth PMOS transistor is connected to the input end of the compensation element, and the gate electrode of the sixth PMOS transistor is connected to the first reset control signal.

The difference between the above two schemes and the scheme in which the first reset element includes only the fifth PMOS transistor is that Vofs1 is controlled with a separate signal line, and T6 is added with the same timing as in FIG. 3. It is possible to adjust data and Vofs1 individually. The remaining operating process is the same as the scheme as shown in FIG. 2, which is not be repeated here.

The above are only embodiments of the present disclosure, not to limit the protection scope of v, where the use of the specification and the accompanying drawings of the equivalent structure or equivalent process transformation, such as the combination of technical features between the embodiments, or directly or indirectly in other related technical fields, are included in the scope of the protection of the present disclosure.

What is claimed is:

1. A pixel circuit, comprising:

a data writing element, configured for controlling an input of a data signal;

a first energy storage element, wherein a first end of the first energy storage element is connected to an output end of the data writing element, and the first energy storage element is configured for storing the data signal output from the data writing element;

a second energy storage element, wherein a first end of the second energy storage element is connected to a high level voltage of device drain (VDD), and a second end of the second energy storage element is connected to a second end of the first energy storage element, and the second energy storage element is configured for storing the data signal together with the first energy storage element;

a light-emitting element, configured for light-emitting display;

a drive element, wherein an input end of the drive element is connected to the high level VDD, a control end of the drive element is connected to the second end of the first energy storage element, and an output end of the drive element is configured for providing a light-emitting current to the light-emitting element;

a light-emitting control transistor, wherein an input end of the light-emitting control transistor is connected to the output end of the drive element, a control end of the light-emitting control transistor is input a light-emitting control signal, and an output end of the light-emitting control transistor is connected to the light-emitting element, and the light-emitting control transistor is configured for controlling a conduction between the drive element and the light-emitting element;

a compensation element, wherein an output end of the compensation element is connected to the second end of the first energy storage element, a control end of the compensation element is input a compensation control signal, and an input end of the compensation element is connected to the output end of the drive element;

a first reset element, wherein an input end of the first reset element is connected to the input end of the compensation element, and an output end of the first reset element is connected to the first end of the first energy storage element.

2. The pixel circuit according to claim 1, wherein the data writing element comprises a first PMOS transistor, and a source electrode of the first PMOS transistor is input the data signal.

3. The pixel circuit according to claim 1, wherein the first energy storage element comprises a first capacitor, and a first end of the first capacitor is connected to the output end of the data writing element.

4. The pixel circuit according to claim 3, wherein the second energy storage element comprises a second capacitor, a first end of the second capacitor is connected to the high level VDD, and a second end of the second capacitor is connected to a second end of the first capacitor.

5. The pixel circuit according to claim 4, wherein the driver element is a PMOS transistor, a source electrode of the PMOS transistor is connected to the high level VDD, and a gate electrode of the PMOS transistor is connected to the second end of the first capacitor and the second end of the second capacitor.

6. The pixel circuit according to claim 5, wherein the compensation element comprises a second PMOS transistor, a drain electrode of the second PMOS transistor is connected to the first end of the first capacitor, and a gate electrode of the second PMOS transistor is input the compensation control signal.

7. The pixel circuit according to claim 6, wherein the light-emitting control transistor comprises a third PMOS transistor, a source electrode of the third PMOS transistor is connected to a source electrode of the second PMOS transistor, and a gate electrode of the third PMOS transistor is input the light-emitting control signal.

8. The pixel circuit according to claim 7, wherein an input end of the light-emitting element is connected to a drain electrode of the light-emitting control transistor.

9. The pixel circuit according to claim 1, further comprising: a second reset element connected to an input end of the light-emitting element and configured to reset the light-emitting element.

10. The pixel circuit according to claim 9, wherein the second reset element comprises a fourth PMOS transistor, a source electrode of the fourth PMOS transistor is connected to a drain electrode of the light-emitting control transistor, a gate electrode of the fourth PMOS transistor is input a second reset signal, and a drain electrode of the fourth PMOS transistor is input an initialization signal.

11. The pixel circuit according to claim 1, wherein the first reset element comprises a fifth PMOS transistor, and a gate electrode of the fifth PMOS transistor is input a first reset control signal.

12. The pixel circuit according to claim 1, wherein the first reset element comprises a fifth PMOS transistor and a sixth PMOS transistor, wherein a gate electrode of the fifth PMOS transistor is input a first reset control signal, a drain electrode of the fifth PMOS transistor is connected to the output end of the data writing element, and a source electrode of the fifth PMOS transistor is input an initialization signal; a drain electrode of the sixth PMOS transistor is input the initialization signal, a source electrode of the sixth PMOS transistor is connected to the second end of the first energy storage element, and a gate electrode of the sixth PMOS transistor is input the first reset control signal.

13. The pixel circuit according to claim 1, wherein the first reset element comprises a fifth PMOS transistor and a sixth PMOS transistor, wherein a gate electrode of the fifth PMOS transistor is input a first reset control signal, a drain electrode of the fifth PMOS transistor is connected to the output end of the data writing element, and a source electrode of the fifth PMOS transistor is input an initialization signal; a drain electrode of the sixth PMOS transistor is connected to the first end of the first energy storage element, a source electrode of the sixth PMOS transistor is connected to the input end of the compensation element, and a gate electrode of the sixth PMOS transistor is input the first reset control signal.

14. A driving method of the pixel circuit according to claim 1, comprising:

turning on initialization by turning on the data writing element, turning on the first reset element, turning on a second reset element, and turning on the drive element;

turning on self-discharging by turning on the data writing element, turning on the compensation element, turning on the second reset element, and turning off the first reset element;

writing information by turning on the data writing element, turning on the second reset element, and turning off the compensation element;

emitting light by turning off the data writing element, turning off the second reset element, and turning on the light-emitting control transistor.

* * * * *